United States Patent
Chen et al.

(10) Patent No.: US 11,252,266 B2
(45) Date of Patent: Feb. 15, 2022

(54) NETWORK TRAFFIC MARKING AND MEASUREMENT METHODS AND NODE

(71) Applicant: Huawei Technologies Co., Ltd., Shenzhen (CN)

(72) Inventors: Zhe Chen, Beijing (CN); Chuang Wang, Beijing (CN); Delei Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 8 days.

(21) Appl. No.: 16/858,268

(22) Filed: Apr. 24, 2020

(65) Prior Publication Data

US 2020/0259934 A1     Aug. 13, 2020

Related U.S. Application Data

(63) Continuation of application No. PCT/CN2019/076869, filed on Mar. 4, 2019.

(30) Foreign Application Priority Data

Mar. 6, 2018 (CN) .......................... 201810184837.4

(51) Int. Cl.
*H04L 29/06* (2006.01)
*H04L 12/26* (2006.01)
*H04L 12/851* (2013.01)

(52) U.S. Cl.
CPC .......... *H04L 69/22* (2013.01); *H04L 43/0876* (2013.01); *H04L 47/2441* (2013.01); *H04L 69/06* (2013.01)

(58) Field of Classification Search
CPC . H04L 69/22; H04L 43/0876; H04L 47/2441; H04L 69/06; H04L 47/11; H04L 45/70
See application file for complete search history.

(56) References Cited

U.S. PATENT DOCUMENTS

2013/0223274 A1   8/2013  Cociglio et al.
2013/0322255 A1*  12/2013 Dillon ................. H04L 43/0888
                                                    370/236

(Continued)

FOREIGN PATENT DOCUMENTS

CN      101635654 A    1/2010
CN      102684935 A    9/2012
WO      2013013720 A1  1/2013

OTHER PUBLICATIONS

Medina et al., "Traffic Matrix Estimation: Existing Techniques and New Directions," Sigcomm'02, pp. 161-174, Pennsylvania, USA (Aug. 19-23, 2002).

(Continued)

*Primary Examiner* — Charles C Jiang
*Assistant Examiner* — Shawn D Miller
(74) *Attorney, Agent, or Firm* — Leydig, Voit & Mayer, Ltd.

(57) ABSTRACT

Embodiments of this application provide network traffic marking and measurement methods and a node, and relate to the field of communications technologies, and specifically, to network traffic measurement and network traffic distribution. The network traffic measurement method includes: receiving, by a second node, a data packet sent by another node in a network, where the data packet is periodically marked by the another node, and each node has a different period of marking a data packet. According to the application, the second node may distinguish, based on the period of marking the data packet, traffic sent by the another node in the network, to obtain network traffic sent by the another node in the network to the second node. Upon implementing the traffic measurement method, data plane overheads can be reduced, and a hardware implementation process is simplified.

17 Claims, 6 Drawing Sheets

(56) References Cited

U.S. PATENT DOCUMENTS

2014/0160975 A1    6/2014  Cociglio
2015/0304973 A1*  10/2015  Ye .................... H04W 74/0816
                                                                370/350
2017/0244623 A1*  8/2017  Cociglio ............... H04L 43/106

OTHER PUBLICATIONS

Zhang et al., "An Information-Theoretic Approach to Traffic Matrix Estimation," Sigcomm'03, pp. 301-312, Karlsruhe, Germany (Aug. 25-29, 2003).
Gunnar et al., "Traffic Matrix Estimation on a Large IP Backbone—A Comparison on Real Data," IMC'04, pp. 149-160, Sicily, Italy (Oct. 25-27, 2004).
Fu et al., "On Flow Marking Attacks in Wireless Anonymous Communication Networks," 25th IEEE International Conference on Distributed Computing Systems (ICSCS '05), XP010807991, pp. 1-11, Institute of Electrical and Electronics Engineers, New York, New York (Jun. 2005).

* cited by examiner

NETWORK TRAFFIC MARKING AND
MEASUREMENT METHODS AND NODE

CROSS-REFERENCE TO RELATED APPLICATIONS

This application is a continuation of International Application No. PCT/CN2019/076869, filed on Mar. 4, 2019, which claims priority to Chinese Patent Application No. 201810184837.4, filed on Mar. 6, 2018. The disclosures of the aforementioned applications are hereby incorporated by reference in their entireties.

TECHNICAL FIELD

Embodiments of the present invention relate to the field of communications technologies, and in particular, to network traffic marking and measurement methods and a node.

BACKGROUND

Figure 1:
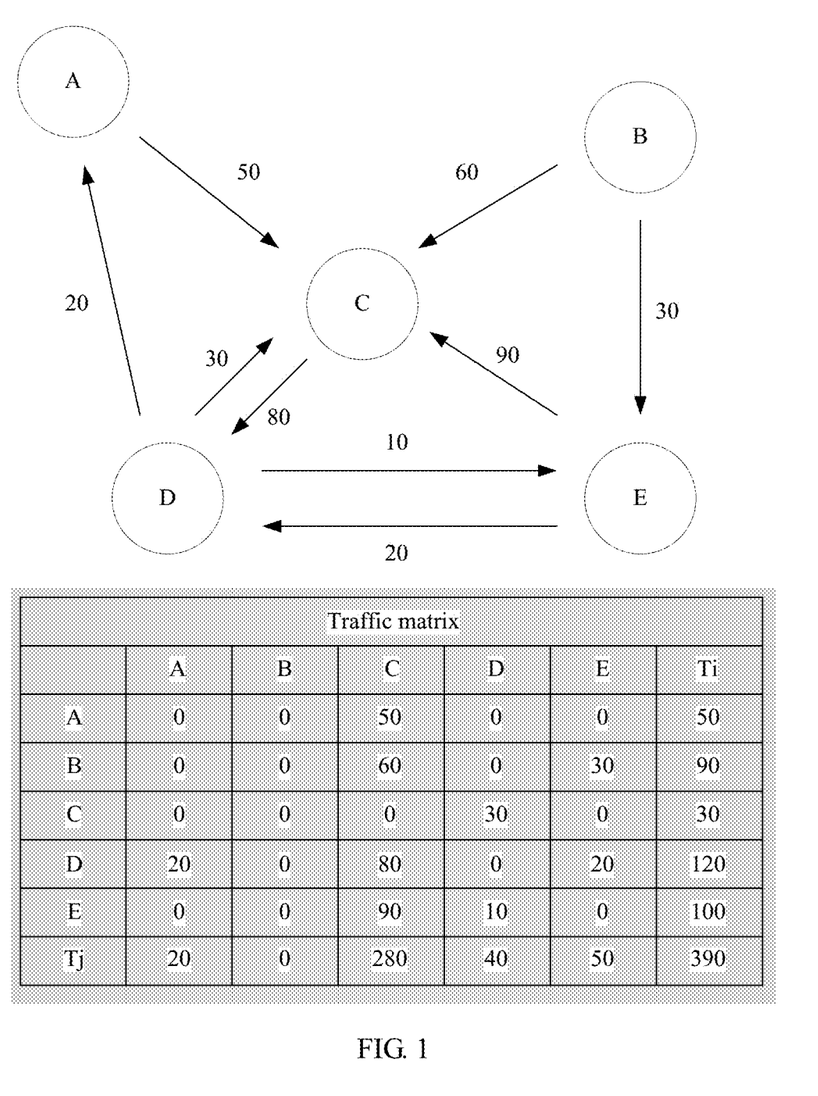
FIG. 1 is a schematic diagram of a traffic matrix according to an embodiment of this application.

A traffic matrix of a network is used to describe traffic distribution between nodes in the network. Each row and each column of the traffic matrix represent different nodes in the network, for example, an element at the $m^{th}$ row and the $n^{th}$ column of the matrix represent traffic sent by the $m^{th}$ node to the $n^{th}$ node in the network. FIG. 1 describes a specific example of a traffic matrix of a network, where the network totally includes five nodes: a node A, a node B, a node C, a node D, and a node E. Arrows in the figure represent traffic directions, and numbers on the arrows represent traffic volumes. For example, in FIG. 1, traffic sent from the node A to the node C is 50 (kilobit/megabit/gigabit per second).

The traffic matrix of the network has many important applications in actual network operation and maintenance, and network optimization, such as traffic engineering, route optimization, precise expansion, and network charging. Therefore, to accurately obtain a traffic matrix of a network in real time is one of important requirements of a network operator.

In the prior art, to measure a traffic matrix of a network, each node adds a node ID of the node (for example, an IP address of the node) to each data packet entering the network. When forwarding a data packet leaving the network, an egress node checks an ingress node ID carried in the data packet, to obtain a volume of traffic sent by another network node to the egress node. Further, the traffic matrix of the network can be obtained by converging traffic information collected by each egress node. It can be learned that a data packet needs to additionally carry a node ID (for example, an IP address of an ingress node), and data plane overheads are relatively high. In addition, when processing a data packet, a network node needs to perform field insertion or deletion, and hardware implementation complexity is high.

SUMMARY

Embodiments of this application provide network traffic marking and measurement methods and a node, to reduce data plane overheads and hardware implementation complexity.

According to a first aspect, an embodiment of this application provides a network traffic marking method, and the method includes:

marking, by each of a plurality of nodes included in a network in an $i^{th}$ period, a first value on a data packet entering the network, and marking, in a $j^{th}$ period, a second value on the data packet entering the network, where i is an odd number, and j is an even number, that is, i=1, 3, 5, 7, . . . , and j=2, 4, 6, 8, . . . ; and each node has a different period of marking a data packet entering the network; and forwarding, by each node, the data packet entering the network based on a destination address in the data packet.

According to the network traffic marking method provided in this embodiment of this application, each of the plurality of nodes included in the network marks, in an odd-number period, the first value on the data packet entering the network, and marks, in an even-number period, the second value on the data packet entering the network, where each node has a different period of marking a data packet entering the network, so that the nodes in the network may be distinguished based on periodically marked data packets. Compared with the prior art in which an IP address of a node needs to be inserted into a data packet, in the technical solution of this application, only numeric marking needs to be performed on the data packet, so that data plane overheads and hardware implementation complexity can be effectively reduced.

In a possible design, the first value is a 1-bit value 1, and the second value is a 1-bit value 0. In this case, overheads of marking the data packet entering the network by the node include one bit, and data plane overheads of the data packet are lower than those in the prior art.

Optionally, that a node marks a data packet entering a network specifically includes: the node may overwrite a fixed bit of the data packet entering the network, for example, may overwrite the first idle bit in a packet header of the data packet entering the network, or overwrite the last idle bit in the packet header of the data packet entering the network, so that the node marks the data packet entering the network.

It may be understood that the node may alternatively mark some fixed bits of the data packet entering the network, that is, the first value or the second value may be a multi-bit binary value. Which fixed bit or fixed bits of a data packet are marked may be predetermined in a communications protocol, or may be determined through negotiation in a specific communication process. This is not limited herein.

According to a second aspect, an embodiment of this application provides a network traffic measurement method, and the method includes:

receiving, by a first node, a data packet sent by another node in a network, where the data packet is periodically marked by the another node in the network, and the another node in the network has a different period of marking a data packet;

measuring, by the first node, traffic of the data packet leaving the network from the node in N preset time periods, to obtain N traffic values, where N is a positive integer greater than or equal to 2;

performing, by the first node, frequency domain transformation on the N traffic values, to obtain a spectrum corresponding to the N traffic values;

separately extracting, by the first node from the spectrum corresponding to the N traffic values, a spectrum corresponding to the another node in the network; and obtaining, by the first node based on the spectrum corresponding to the another node in the network, network traffic sent by the another node in the network to the first node in the N preset time periods.

According to the network traffic measurement method provided in this embodiment of this application, a node in the network receives the data packet periodically marked by the another node in the network, and each node in the network has a different period of marking a data packet entering the network, so that actual network traffic sent by the another node in the network to the node can be measured. Compared with the prior art in which an IP address of a node needs to be inserted into a data packet, in the solution provided in this embodiment of this application, only numeric marking needs to be performed on the data packet, so that data plane overheads are effectively reduced, and an implementation process is simpler.

In a possible design, the data packet is periodically marked by the another node; in other words, before the first node receives the data packet sent by the another node in the network, each of the other nodes in the network periodically marks a data packet entering the network from the node, where each node has a different period of marking a data packet. It may be understood that each of the other nodes in the network may be distinguished based on different periods of marking data packets.

Optionally, each of the other nodes in the network marks, in an $i^{th}$ period, a first value on each data packet entering the node, and marks, in a $j^{th}$ period, a second value on each data packet entering the node, where i is an odd number, and j is an even number, that is, i=1, 3, 5, 7, . . . , and j=2, 4, 6, 8 . . . . Further, the first value may be a 1-bit value 1, and the second value may be a 1-bit value 0; and vice versa. In this case, overheads of marking the data packet entering the network by the node include one bit, and data plane overheads of the data packet are lower than those in the prior art.

In a possible design, the measuring traffic of the data packet leaving the network from the node in N preset time periods, to obtain N traffic values includes:

setting a SUM value of a counter to 0 at the beginning of each of the N preset time periods, where when a data packet marked with the first value is received in the preset time period, the SUM value of the counter is equal to a sum of a current SUM value of the counter and a traffic value of the data packet; when a data packet marked with the second value is received in the preset time period, the SUM value of the counter is equal to a value obtained by subtracting a traffic value of the data packet from the current SUM value of the counter; and at the end of the preset time period, a value of the counter is a traffic value in one preset time period. It can be learned that because the counter is used to calculate network traffic, an implementation process is simpler.

According to a third aspect, an embodiment of this application provides a node, and the node includes:

a marking module, configured to mark, in an $i^{th}$ period, a first value on a data packet entering a network, and mark, in a $j^{th}$ period, a second value on the data packet entering the network, where i is an odd number, and j is an even number, that is, i=1, 3, 5, 7, . . . , and j=2, 4, 6, 8, . . . ; and a sending module, configured to forward the data packet entering the network based on a destination address in the data packet.

The node provided in this embodiment in this application marks, in an odd-number period, the first value on the data packet entering the network and marks, in an even-number period, the second value on the data packet entering the network, and each node in the network has a different period of marking a data packet entering the network, so that the nodes in the network may be distinguished based on periodically marked data packets. Compared with the prior art in which an IP address of a node needs to be inserted into a data packet, in the technical solution of this application, only numeric marking needs to be performed on the data packet, so that data plane overheads and hardware implementation complexity can be effectively reduced.

In a possible design, the first value is a 1-bit value 1, and the second value is a 1-bit value 0. In this case, overheads of marking the data packet entering the network by the node include one bit, and data plane overheads of the data packet are lower than those in the prior art.

Optionally, that a node marks a data packet entering a network specifically includes: the node may overwrite a fixed bit of the data packet entering the network, for example, may overwrite the first idle bit in a packet header of the data packet entering the network, or overwrite the last idle bit in the packet header of the data packet entering the network, so that the node marks the data packet entering the network.

It may be understood that the node may alternatively mark some fixed bits of the data packet entering the network, that is, the first value or the second value may be a multi-bit binary value. Which fixed bit or fixed bits of a data packet are marked may be predetermined in a communications protocol, or may be determined through negotiation in a specific communication process. This is not limited herein.

According to a fourth aspect, an embodiment of this application provides another type of node, and the node includes:

a receiving module, configured to receive a data packet sent by another node in a network, where the data packet is periodically marked by the another node in the network, and the another node in the network has a different period of marking a data packet;

a measurement module, configured to measure traffic of the data packet leaving the network from the node in N preset time periods, to obtain N traffic values, where N is a positive integer greater than or equal to 2;

a frequency domain transformation module, configured to perform frequency domain transformation on the N traffic values to obtain a spectrum corresponding, to the N traffic values;

an extraction module, configured to separately extract, from the spectrum corresponding to the N traffic values, a spectrum corresponding to the another node in the network; and an obtaining module, configured to obtain, based on the spectrum corresponding to a marking period of the another node in the network, network traffic sent by the another node in the network to the first node in the N preset time periods.

The another type of node provided in this embodiment of this application receives the data packet periodically marked by the another node in the network, and each node in the network has a different period of marking a data packet entering the network, so that actual network traffic sent by the another node in the network to the node can be measured. Compared with the prior art in which an IP address of a node needs to be inserted into a data packet, in the solution provided in this embodiment of this application, only numeric marking needs to be performed on the data packet, so that data plane overheads are effectively reduced, and an implementation process is simpler.

In a possible design, the data packet is periodically marked by the another node; in other words, before the second node receives the data packet sent by the another node in the network, each of the other nodes in the network periodically marks a data packet entering the node, where each node has a different period of marking a data packet.

It may be understood that each of the other nodes in the network may be distinguished based on different periods of marking data packets.

Optionally, each of the other nodes in the network marks, in an $i^{th}$ period, a first value on each data packet entering the node, and marks, in a $j^{th}$ period, a second value on each data packet entering the node, where i is an odd number, and j is an even number, that is, i=1, 3, 5, 7, . . . , and j=2, 4, 6, 8 . . . . Further, the first value may be a 1-bit value 1, and the second value may be a 1-bit value 0; and vice versa. In this case, overheads of marking the data packet entering the network by the node include one bit, and data plane overheads of the data packet are lower than those in the prior art.

In a possible design, the measuring traffic of the data packet leaving the network from the node in N preset time periods, to obtain N traffic values includes:

setting a SUM value of a counter to 0 at the beginning of each of the N preset time periods, where when a data packet marked with the first value is received in the preset time period, the SUM value of the counter is equal to a sum of a SUM value of the counter and a traffic value of the data packet; when a data packet marked with the second value is received in the preset time period, the SUM value of the counter is equal to a value obtained by subtracting a traffic value of the data packet from the SUM value of the counter; and at the end of the preset time period, a value of the counter is a traffic value in one preset time period. It can be learned that because the counter is used to calculate network traffic, an implementation process is simpler.

According to a fifth aspect, an embodiment of this application provides a node, configured to perform the method in the first aspect. A structure of the node includes a processor and a sender. The processor is configured to support the node in performing a corresponding function in the foregoing method, for example, generating or processing data and/or information used in the foregoing method. The sender is configured to support the node in sending the data, the information or an instruction used in the foregoing method, for example, sending the foregoing data packet. In a possible design, the node may further include a receiver, and the receiver is configured to receive information or an instruction. In a possible design, the node may further include a memory, and the memory is configured to couple with the processor, and store a program instruction and data that are required by the node.

According to a sixth aspect, an embodiment of this application provides another type of node, configured to perform the method in the second aspect. A structure of the node includes a processor and a receiver. The processor is configured to support the node in performing a corresponding function in the foregoing method, for example, generating or processing data and/or information used in the foregoing method. The receiver is configured to support the node in receiving data and/or information used in the foregoing method. In a possible design, the node may further include a sender, configured to send information or an instruction. In a possible design, the node may further include a memory, and the memory is configured to couple with the processor, and store a program instruction and data that are required by the node.

According to a seventh aspect, an embodiment of this application provides a network system, and the system includes the nodes in the third aspect and the fourth aspect.

According to an eighth aspect, an embodiment of this application provides a computer-readable storage medium, including an instruction, and when the instruction runs on a node, the node is enabled to perform the traffic marking method according to the first aspect or any one of possible designs in the first aspect.

According to a ninth aspect, an embodiment of this application provides a computer-readable storage medium, including an instruction, and when the instruction runs on a node, the node is enabled to perform the traffic measurement method in the second aspect or any one of the possible designs in the second aspect.

According to a tenth aspect, an embodiment of this application provides a computer program product including an instruction, and when the computer program product runs on a node, the node is enabled to perform the traffic marking method according to the first aspect or any one of the possible designs in the first aspect.

According to an eleventh aspect, an embodiment of this application provides a computer program product including an instruction, and when the computer program product runs on a node, the node is enabled to perform the traffic measurement method in the second aspect or any one of the possible designs in the second aspect.

According to a twelfth aspect, this application provides a chip system, and the chip system includes a processor, configured to support a node in implementing a function used in the method in the first aspect, for example, generating or processing data and/or information used in the foregoing method. In a possible design, the chip system further includes a memory, and the memory is configured to store a program instruction and data that are required by the node. The chip system may include a chip, or may include a chip and another discrete device.

According to a thirteenth aspect, this application provides a chip system, and the chip system includes a processor, configured to support a node in implementing a function used in the method in the second aspect, for example, receiving or processing data and/or information used in the foregoing method. In a possible design, the chip system further includes a memory, and the memory is configured to store a program instruction and data that are required by the node. The chip system may include a chip, or may include a chip and another discrete device.

According to the node and the traffic marking and measurement methods provided in the embodiments of this application, the data packet periodically marked by the another node in the network is received, and each node in the network has a different period of marking a data packet entering the network, so that actual network traffic sent by the another node in the network to the node can be measured. Compared with the prior art in which an IP address of a node needs to be inserted into a data packet, in the solutions provided in the embodiments of this application, only numeric marking needs to be performed on the data packet, so that data plane overheads of the data packet are effectively reduced, and an implementation process is simpler.

DETAILED DESCRIPTION OF EMBODIMENTS

The following further describes in detail this application with reference to accompanying drawings.

Figure 2:
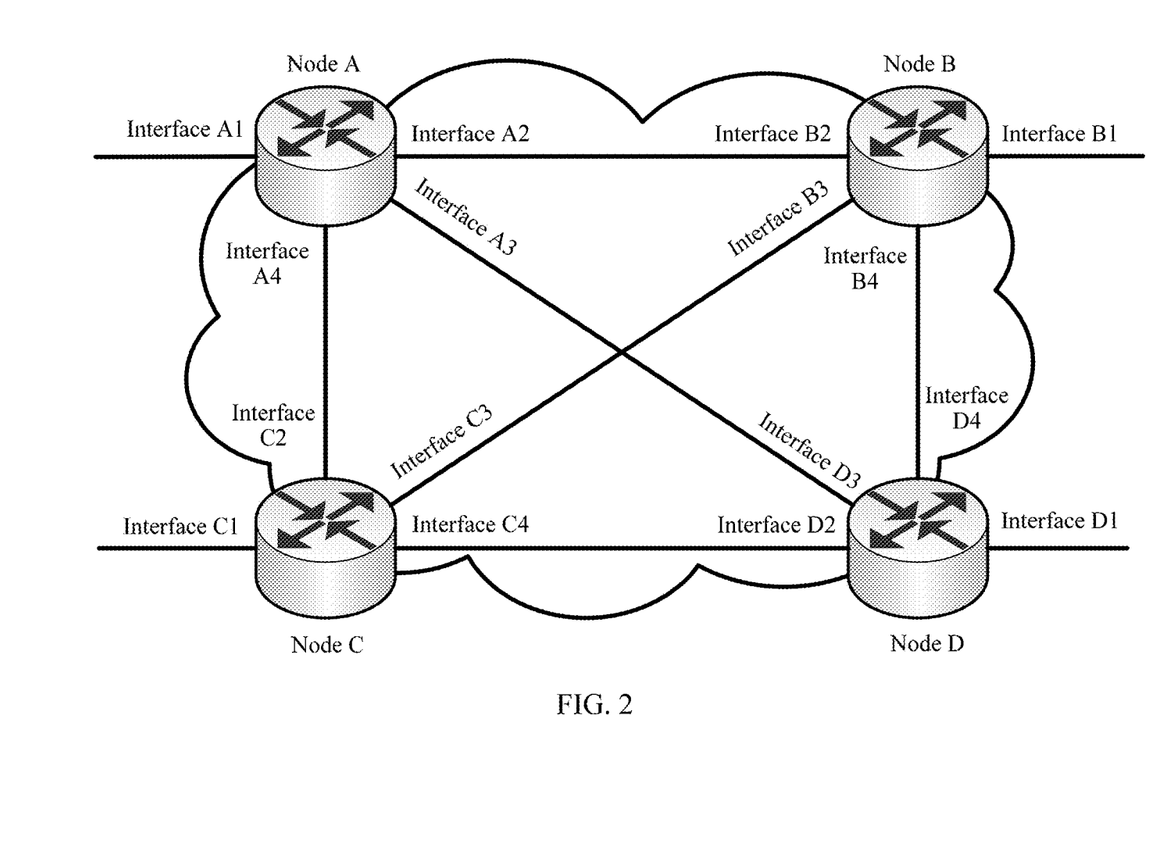
FIG. 2 is a schematic diagram of a network in an application scenario according to an embodiment of this application.

FIG. 2 is a schematic diagram of a network in an application scenario according to an embodiment of this application. As shown in FIG. 2, the network 200 includes four nodes: a node A, a node B, a node C, and a node D. The four nodes are connected in a wired manner. It can be seen that each node has four interfaces, where interfaces A1, B1, C1, and D1 are inter-domain interfaces, and the remaining interfaces are intra-domain interfaces. It should be understood that FIG. 2 provides description merely based on an example in which the network includes four nodes. However, this embodiment of this application is not limited thereto. For example, the network may also include more nodes. It should be further noted that the network may be an entire network, or a part of a network. In the application scenario of this embodiment of this application, both the entire network and a part of a network are collectively referred to as a network.

A node may be but is not limited to a router. Any node may be configured at least to: receive a data packet from another node in the network or from a network element outside the network; and determine, based on a destination address included in the data packet, to forward the data packet to the next destination address or node. In addition, in this embodiment of this application, the node may perform all other operations of a network device.

To facilitate understanding of the solution of this application, the following explains several concepts used in this application.

A data packet entering a network and a data packet leaving a network:

In the network shown in FIG. 2, for the node A, a data packet received through the interface A1 of the node A and sent through an interface A2, A3, or A4 is defined as a packet entering the network; and a packet received through the interface A2, A3, or A4 and sent through the interface A1 is defined as a packet leaving the network. Similarly, for the node B, a packet received through the interface B1 and sent through an interface B2, B3, or B4 is defined as a packet entering the network; and a packet received through the interface B2, B3, or B4 and sent through the interface B1 is defined as a packet leaving the network. For the node C, a packet received through the interface C1 and sent through an interface C2, C3, or C4 is defined as a packet entering the network; and a packet received through the interface C2, C3, or C4 and sent through the interface C1 is defined as a packet leaving the network. For the node D, a packet received through the interface D1 and sent through an interface D2, D3, or D4 is defined as a packet entering the network; and a packet received through the interface D2, D3, or D4 and sent through the interface D1 is defined as a packet leaving the network.

Based on the foregoing concepts, the following describes in detail specific processes of the network traffic marking and measurement methods provided in the embodiments of this application.

Figure 3:
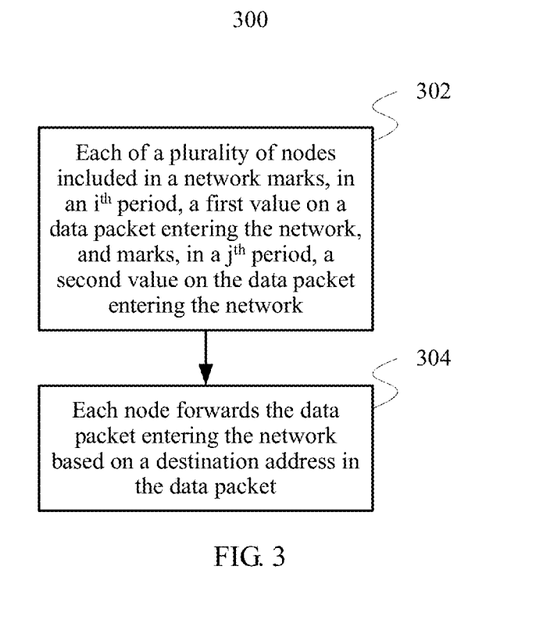
FIG. 3 is a schematic flowchart of a network traffic marking method according to an embodiment of this application.

FIG. 3 is a schematic flowchart of a network traffic marking method 300 according to an embodiment of this application. In a specific implementation process, a node for performing the method 300 may be, for example, but is not limited to, any one of the node A, the node B, the node C, and the node D in FIG. 2.

Step 301: Each of a plurality of nodes included in a network marks, in an $i^{th}$ period, a first value on a data packet entering the network, and marks, in a $j^{th}$ period, a second value on the data packet entering the network, where i is an odd number, and j is an even number, that is i=1, 3, 5, 7, . . . , and j=2, 4, 6, 8, . . . ; and each node has a different period of marking a data packet entering the network.

When a data packet enters the network, each of the plurality of nodes included in the network is required to periodically mark the data packet entering the network. The node A in the network shown in FIG. 2 is used as an example. The node A marks, in the $i^{th}$ period, the first value on the data packet entering the network, and marks, in the $j^{th}$ period, the second value on the data packet entering the network. It may be understood that durations of the $i^{th}$ period and the $j^{th}$ period are the same, that is, periods of marking a data packet by the node A are the same. In addition, i is an odd number, that is, i=1, 3, 5, 7, . . . ; j is an even number, that is, j=2, 4, 6, 8, . . . . In other words, in a first period, the node A marks the first value on the data packet entering the network; in a second period, the node A marks the second value on the data packet entering the network; in a third period, the node A marks the first value on the data packet entering the network; and in a fourth period, the node A marks the second value on the data packet entering the network, and so on.

In a possible design, the node A may mark a packet header of the data packet entering the network, that is, marking on any idle bit in the packet header of the data packet. Specifically, the node A may rewrite, in the $i^{th}$ period, a fixed bit in the packet header of the data packet entering the network into the first value, and rewrite, in the $j^{th}$ period, the fixed bit in the packet header of the data packet entering the network into the second value. For example, the node A may rewrite, in the first period, the first idle bit in the packet header of the data packet entering the network into 1, rewrite, in the second period, the first idle bit in the packet header of the data packet entering the network into 0, rewrite, in the third period, the first idle bit in the packet header of the data packet entering the network into 1, rewrite, in the fourth period, the first idle bit in the packet header of the data packet entering the network into 0, and so on. It may be understood that, that the first value herein is 1 and the second value herein is 0 is used as an example. On the contrary, the first value may be 0, and the second value may be 1. Certainly, the first value and the second value may alternatively be binary numbers or decimal numbers with lengths of another quantity of bits.

It should be noted that a first node may alternatively mark the data packet on another part of the data packet entering the network, for example, mark on another inherent field in the data packet, or mark on a newly added field in the data packet, which is not limited herein.

Step 302: Each node forwards the data packet entering the network based on a destination address in the data packet.

The node A in the network shown in FIG. 2 is still used as an example. After marking a data packet entering the network, the node A forwards the marked data packet based on a destination address in the marked data packet. For example, after marking the data packet entering the network, the node A forwards the data packet to the node B in a next hop through the interface A2 based on the destination address included in the data packet; and the node B forwards the data packet to another node outside the network through the interface B1 based on the destination address. In this case, the data packet leaves the network from the node B.

It should be noted that each of the plurality of nodes included in the network has a different period of marking the data packet entering the network. The four nodes included in the network shown in FIG. 2 are used as an example. The period of marking the data packet entering the network by the node A may be Ta=16 ms, the period of marking the data packet entering the network by the node B may be Tb=32 ms, the period of marking the data packet entering the network by the node C may be Tc=64 ms, and the period of marking the data packet entering the network by the node D may be Td=128 ms.

It can be learned that, according to the network traffic marking method provided in this embodiment of this application, each of the plurality of nodes included in the network periodically marks the data packet entering the network, and each node has a different period of marking the data packet, so that the nodes in the network may be distinguished based on periodically marked data packets. Compared with the prior art in which an IP address of a node needs to be inserted into a data packet, in the technical solution of this application, only numeric marking needs to be performed on the data packet, so that data plane overheads and hardware implementation complexity can be effectively reduced.

Figure 4:
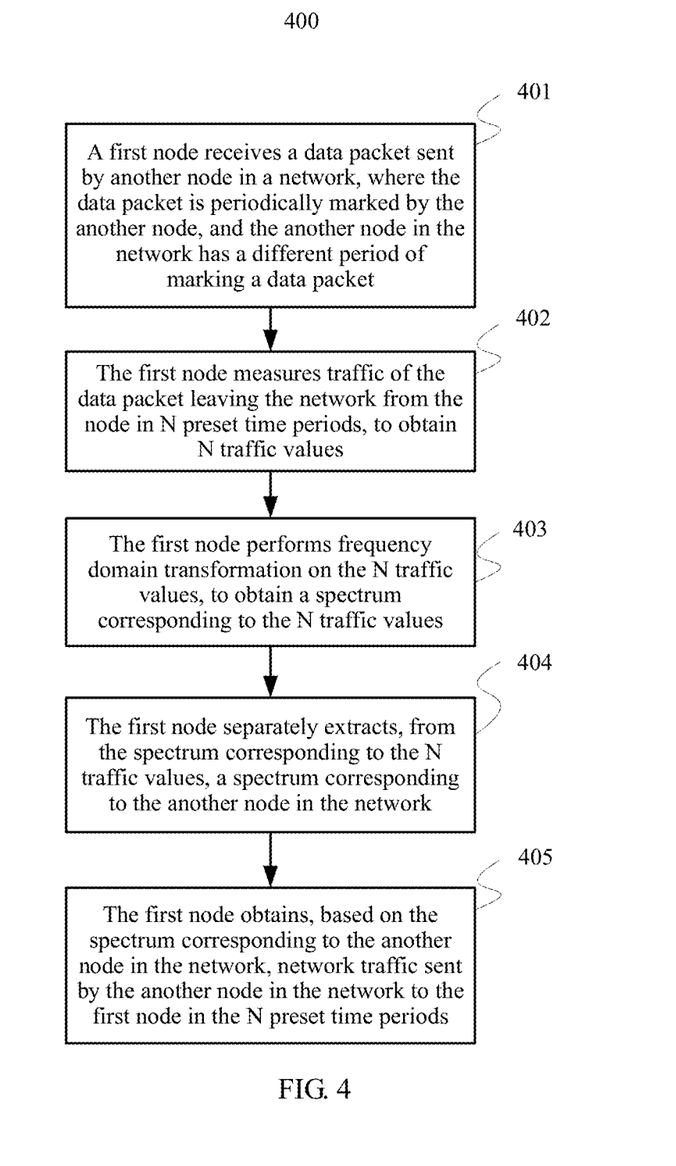
FIG. 4 is a schematic flowchart of a network traffic measurement method according to an embodiment of this application.

FIG. 4 is a schematic flowchart of a network traffic measurement method 400 according to an embodiment of this application. In a specific implementation process, a node for performing the method 400 may be, for example, but is not limited to, any one of the node A, the node B, the node C, and the node D in FIG. 2.

Step 401: A first node receives a data packet sent by another node in a network, where the data packet is periodically marked by the another node in the network, and the another node in the network has a different period of marking a data packet.

In the method described in FIG. 3, each of the plurality of nodes included in a network periodically marks the data packet entering the network, and each node has a different period of marking the data packet. It may be understood that the first node is distinguished from the another node in the network. That the first node is the node A in the network shown in FIG. 2 is used as an example for description. Specifically, the node A separately receives data packets sent by the node B, the node C, and the node D, where the data packet sent by the node B is a data packet marked by the node B based on a period Tb, the data packet sent by the node C is a data packet marked by the node C based on a period Tc, the data packet sent by the node D is a data packet marked by the node D based on a period Td, and Tb, Tc, and Td are different from each other. For a specific marking method, refer to the description in FIG. 3. Details are not described herein again.

Step 402: The first node measures traffic of the data packet leaving the network from the node in N preset time periods, to obtain N traffic values, where N is a positive integer greater than or equal to 2.

The first node measures the traffic of the data packet leaving the network from the node in the N preset time periods. N may be a positive integer greater than or equal to 2. For example, N may be equal to 1024. The preset time period may be any duration, for example, may be 1 ms, that is, the first node may measure the traffic of the data packet leaving the network from the node in 1024 multiplies 1 ms time periods, to obtain 1024 traffic values.

In a specific implementation process, the first node may measure, by using a counter, the traffic of the data packet leaving the network from the node in the 1024 multiplies 1 ms time periods. Specifically, at the beginning of each preset time period, namely, at the beginning of each 1 ms, the first node sets a value of the counter to 0; when a data packet marked with the first value leaves the network, the value of the counter is equal to a sum of a current value of the counter and a traffic value of the data packet; when a data packet marked with the second value leaves the network, the value of the counter is equal to a value obtained by subtracting a traffic value of the data packet from the current value of the counter; and at the end of each preset time period, namely, at the end of each 1 ms, the value of the counter is recorded, and the value is used as traffic of the data packet leaving the network from the node in each preset time period. For example, at the beginning of the first 1 ms, the first node sets the value of the counter to 0; when the data packet marked with the first value leaves the network, and the traffic value of the data packet is 150 bytes, the value of the counter is SUM=0+150=150; when a data packet marked with the second value leaves the network, and the traffic value of the data packet is 100 bytes, the value of the counter is SUM=150−100=50; and by analogy, at the end of the first 1 ms, the value of the counter is recorded, for example, if the value of the counter is 120 at this time, the traffic of the data packet leaving the network from the node in the first 1 ms is 120 bytes.

Step 403: The first node performs frequency domain transformation on the N traffic values, to obtain a spectrum corresponding to the N traffic values.

It should be noted that the first node may perform discrete Fourier transform on the N traffic values to obtain a spectrum corresponding to the N traffic values, or may perform another transformation from time domain to frequency domain to obtain the spectrum corresponding to the N traffic values.

Step 404: The first node separately extracts, from the spectrum corresponding to the N traffic values, a spectrum corresponding to the another node in the network.

The first node performs frequency domain transformation on the N traffic values, for example, may perform discrete Fourier transform on the N traffic values to obtain the spectrum corresponding to the N traffic values, and separately extract, from the spectrum, the spectrum corresponding to the another node in the network. It may be understood that the another node has a different period of marking a data packet, and therefore, a frequency corresponding to a marking period of each node in the foregoing spectrum is different, each frequency has a corresponding spectrum value, and then a spectrum corresponding to each of the other nodes can be separately obtained.

For example, the first node is the node A in the network shown in FIG. 2. As described above, the node B, the node C, and the node D have different periods (Tb, Tc, and Td) of marking data packets entering the network. Therefore, traffic values corresponding to data packets sent by the node B, the node C, and the node D to the node A correspond to different frequencies in the spectrum. For example, the traffic value corresponding to the data packet sent by the node B to the node A corresponds to a frequency [b1, b2, b3, . . . ] in the spectrum, the traffic value corresponding to the data packet sent by the node C to the node A corresponds to a frequency [c1, c2, c3, . . . ] in the spectrum, and the traffic value corresponding to the data packet sent by the node D to the node A corresponds to a frequency [d1, d2, d3, . . . ] in the spectrum. The node A respectively extracts, from the spectrum, spectrum values (including amplitude values and phase values) corresponding to the data packets sent by the node B, the node C, and the node D, to obtain spectrums corresponding to the traffic values of the node B, the node C, and the node D.

Step 405: The first node obtains, based on the spectrum corresponding to the another node in the network, network traffic sent by the another node in the network to the first node in the N preset time periods.

In a specific implementation process, the first node may separately perform transformation from frequency domain to time domain on the spectrum corresponding to the another node in the network, for example, perform inverse discrete Fourier transformation, to separately obtain N traffic values (each preset time period corresponds to one traffic value) sent by the another node to the first node in the N preset time periods. Based on the N traffic values, the first node may separately obtain network traffic sent by the another node to the first node in the N preset time periods, namely, network traffic sent by each of the other nodes to the first node in the N preset time periods. Specifically, that the first node is the node A in the network shown in FIG. 2 is used as an example. The node A separately performs inverse discrete Fourier transformation on spectrums corresponding to the node B, the node C, and the node D in the network, to obtain N traffic values corresponding to data packets sent by the node B, the node C, and the node D to the node A in the N preset time periods, and then separately takes absolute values of the N traffic values, to obtain network traffic actually sent by the node B, the node C, and the node D to the node A in the N preset time periods, that is, each preset time period corresponds to one network traffic value.

It can be learned that, according to the solution provided in this embodiment of this application, a node in the network receives the data packet periodically marked by the another node in the network, and each node has a different period of marking a data packet, so that actual network traffic sent by the another node in the network to the node can be measured. Compared with the prior art in which an IP address of a node needs to be inserted into a data packet, in the solution provided in this embodiment of this application, only numeric marking needs to be performed on the data packet, so that data plane overheads are effectively reduced, and an implementation process is simpler.

It may be understood that each of the plurality of nodes included in the network measures, based on the foregoing method, network traffic sent by the another node in the network to the node in a preset time period. The network traffic that is sent by the another node and that is measured by each node is shown in a matrix form shown in FIG. 1, and therefore, a traffic matrix of the network is obtained.

Figure 5:
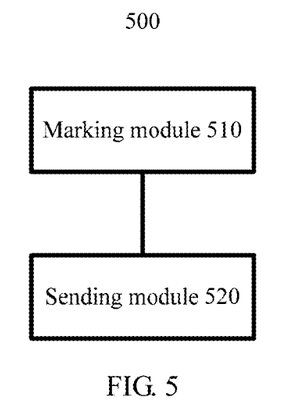
FIG. 5 is a schematic diagram of a logical structure of a node according to an embodiment of this application.

FIG. 5 is a schematic diagram of a logical structure of a node 500 according to an embodiment of this application. In a specific implementation process, the node may be, for example, but is not limited to, any one of the node A, the node B, the node C, and the node D in FIG. 1. The node includes a marking module 510 and a sending module 520.

The marking module 510 is configured to mark, in an $i^{th}$ period, a first value on a data packet entering a network, and mark, in a $j^{th}$ period, a second value on the data packet entering the network, where i is an odd number, and j is an even number, that is, i=1, 3, 5, 7, . . . , and j=2, 4, 6, 8, . . . .

The sending module 520 is configured to forward the data packet entering the network based on a destination address in the data packet.

In a possible design, the first value is a 1-bit value 1, and the second value is a 1-bit value 0. In this case, overheads of marking the data packet entering the network by the node include one bit, and data plane overheads of the data packet are lower than those in the prior art.

Optionally, the node may rewrite a fixed bit of the data packet entering the network, for example, may rewrite the first idle bit in a packet header of the data packet entering the network, or rewrite the last idle bit in the packet header of the data packet entering the network, so that the node marks the data packet entering the network.

It may be understood that, which bit or bits of a data packet are marked may be predetermined in a communications protocol, or may be determined through negotiation in a specific communication process. This is not limited herein.

It can be learned that the first value is marked, in an odd-number period, on the data packet entering the network, the second value is marked, in an even-number period, on the data packet entering the network, and each node in the network has a different period of marking the data packet entering the network, so that the nodes in the network may be distinguished based on periodically marked data packets. Compared with the prior art in which an IP address of a node needs to be inserted into a data packet, in the technical solution of this application, only numeric marking needs to be performed on the data packet, so that data plane overheads and hardware implementation complexity can be effectively reduced.

It should be noted that related technical features of the node 500 have been described in detail above with reference to the accompanying drawings, for example, but not limited to, FIG. 3 and the method 300. Therefore, details are not described herein again.

Figure 6:
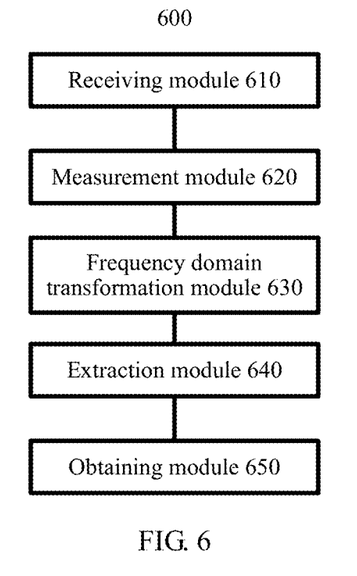
FIG. 6 is a schematic diagram of a logical structure of another type of node according to an embodiment of this application.

FIG. 6 is a schematic diagram of a logical structure of another type of node 600 according to an embodiment of this application. In a specific implementation process, the node may be, for example, but is not limited to, any one of the node A, the node B, the node C, and the node D in FIG. 1. The node includes:

a receiving module 610, configured to receive a data packet sent by another node in a network, where the data packet is periodically marked by the another node in the network, and the another node in the network has a different period of marking a data packet;

a measurement module 620, configured to measure traffic of the data packet leaving the network from the node in N preset time periods, to obtain N traffic values, where N is a positive integer greater than or equal to 2;

a frequency domain transformation module 630, configured to perform frequency domain transformation on the N traffic values, to obtain a spectrum corresponding to the N traffic values;

an extraction module 640, configured to separately extract, from the spectrum corresponding to the N traffic values, a spectrum corresponding to the another node in the network; and an obtaining module 650, configured to obtain, based on the spectrum corresponding to the another node in the network, network traffic sent by the another node in the network to the first node in the N preset time periods.

In a possible design, the data packet is periodically marked by the another node in the network, in other words, before the first node receives the data packet sent by the another node in the network, each of the other nodes in the network periodically marks the data packet entering the network from the node, where each node has a different period of marking a data packet. It may be understood that each of the other nodes in the network may be distinguished based on different periods of marking data packets.

Optionally, each of the other nodes in the network marks, in an $i^{th}$ period, a first value on each data packet entering the network from the node, and marks, in a $j^{th}$ period, a second value on each data packet entering the network from the node, where i is an odd number, and j is an even number, that is, i=1, 3, 5, 7, . . . , and j=2, 4, 6, 8 . . . . Further, the first value may be a 1-bit value 1, and the second value may be a 1-bit value 0; and vice versa.

In a possible design, the measuring traffic of the data packet leaving the network from the node in N preset time periods, to obtain N traffic values includes:

setting a SUM value of a counter to 0 at the beginning of each of the N preset time periods, where when a data packet marked with the first value is received in the preset time period, the SUM value of the counter is equal to a sum of a SUM value of the counter and a traffic value of the data packet; when a data packet marked with the second value is received in the preset time period, the SUM value of the counter is equal to a value obtained by subtracting a traffic value of the data packet from the SUM value of the counter; and at the end of the preset time period, a value of the counter is a traffic value in one preset time period. It can be learned that because the counter is used to calculate network traffic, an implementation process is simpler.

It can be learned that the data packet periodically marked by the another node in the network is received, and each node in the network has a different period of marking the data packet entering the network, so that actual network traffic sent by the another node in the network to the node can be measured. Compared with the prior art in which an IP address of a node needs to be inserted into a data packet, in the solution provided in this embodiment of this application, only numeric marking needs to be performed on the data packet, so that data plane overheads are effectively reduced, and an implementation process is simpler.

It should be noted that related technical features of the node 600 have been described in detail above with reference to the accompanying drawings, for example, but not limited to, FIG. 4 and the method 400. Therefore, details are not described herein again.

Figure 7:
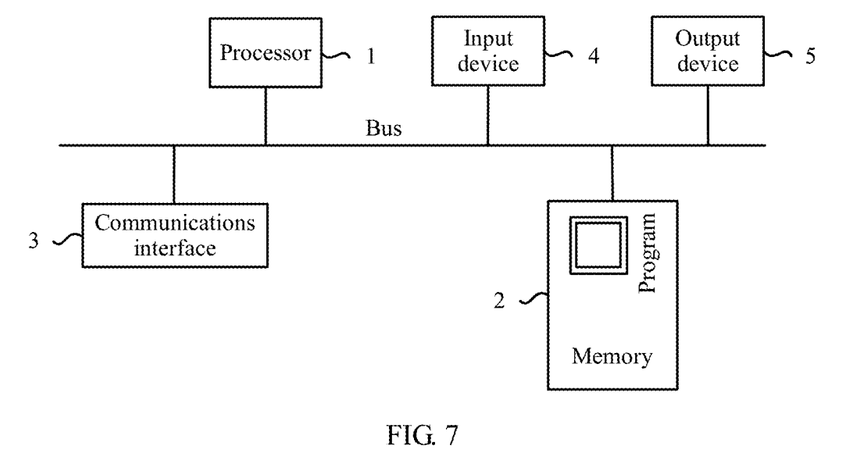
FIG. 7 is a schematic diagram of a hardware structure of a node according to an embodiment of this application.

FIG. 7 is a schematic diagram of a hardware structure of a node according to an embodiment of this application. The node is configured to perform the network traffic marking method shown in FIG. 3, and includes:

a bus, a controller/processor 1, a memory 2, a communications interface 3, an input device 4, and an output device 5. The processor 1, the memory 2, the communications interface 3, the input device 4, and the output device 5 are connected to one another by using the bus.

The bus may include a channel used to transmit information between components of a computer system.

The controller/processor 1 may be a general-purpose processor, such as a general-purpose central processing unit (CPU), a network processor (NP for short), or a micropro-cessor, or may be an application-specific integrated circuit (ASIC), or one or more integrated circuits configured to control program execution in the solution of the present invention. The controller/processor 1 may also be a digital signal processor (DSP), an application-specific integrated circuit (ASIC), a field programmable gate array (FPGA), or another programmable logic device, a discrete gate, a transistor logic device, or a discrete hardware component. Alternatively, the controller/processor 1 may be a combination for implementing a computing function, for example, a combination of one or more microprocessors, or a combination of the DSP and the microprocessor.

The memory 2 stores a program used to execute the technical solution of the present invention, and may also store an operating system and another application program. Specifically, the program may include program code, and the program code includes a computer operation instruction. More specifically, the memory 2 may be a read-only memory (ROM), another type of static storage device that can store static information and instructions, a random access memory (RAM), another type of dynamic storage device that can store information and instructions, a magnetic disk storage, or the like.

The input device 4 may include an apparatus for receiving data and information entered by a user, such as a keyboard, a mouse, a camera, a scanner, a light pen, a voice input apparatus, and a touchscreen.

The output device 5 may include an apparatus that is allowed to output information to a user, such as a display screen, a printer, and a speaker.

The communications interface 3 may be an apparatus that uses any type of transceiver, to communicate with another device or a communications network, such as Ethernet, a radio access network (RAN), and a wireless local area network (WLAN). The communications interface 3 may be configured to support the node in communicating with another apparatus. For example, the communications interface 3 is configured to support the node A in the network shown in FIG. 2 in communicating with the other nodes (the node B, the node C, and the node D). The communications interface 3 may also be configured to implement functions of the step 302 and the sending module 520.

The controller/processor 1 may be configured to perform the processing process in FIG. 3 and/or another process of the technology described in this application. The controller/processor 1 may also be configured to implement the step 301 and functions of the marking module 510.

It may be understood that FIG. 7 merely shows a simplified design of the node. In actual application, the node may include any quantity of processors, controllers, memories, communications interfaces, and the like, and any node that can implement this embodiment of this application falls within the protection scope of this application.

Figure 8:
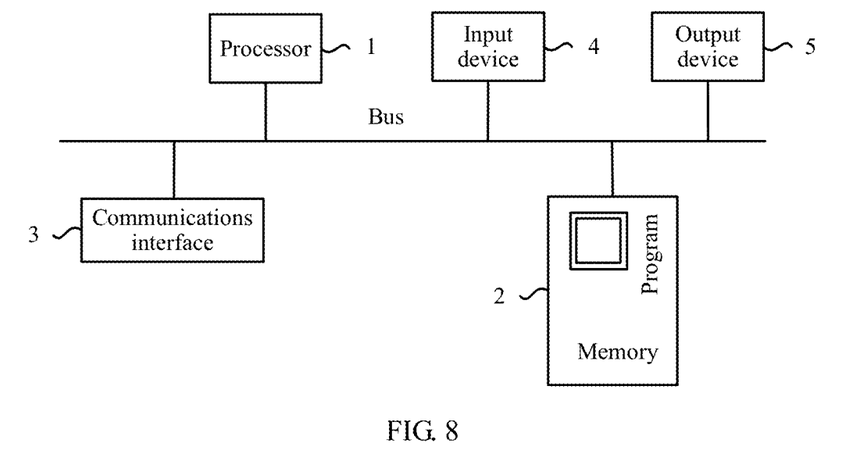
FIG. 8 is a schematic diagram of a hardware structure of another type of node according to an embodiment of this application.

FIG. 8 is a schematic diagram of a hardware structure of a node according to an embodiment of this application. The node is configured to perform the network traffic measurement method shown in FIG. 4, and includes:

a bus, a controller/processor 1, a memory 2, a communications interface 3, an input device 4, and an output device 5. The processor 1, the memory 2, the communications interface 3, the input device 4, and the output device 5 are connected to one another by using the bus.

The bus may include a channel used to transmit information between components of a computer system.

The controller/processor 1 may be a general-purpose processor, such as a general-purpose central processing unit (CPU), a network processor (NP for short), or a microprocessor, or may be an application-specific integrated circuit (ASIC), or one or more integrated circuits configured to control program execution in the solution of the present invention. The controller/processor 1 may also be a digital signal processor (DSP), an application-specific integrated circuit (ASIC), a field programmable gate array (FPGA), or another programmable logic device, a discrete gate, a transistor logic device, or a discrete hardware component. Alternatively, the controller/processor 1 may be a combination for implementing a computing function, for example, a combination of one or more microprocessors, or a combination of the DSP and the microprocessor.

The memory 2 stores a program used to execute the technical solution of the present invention, and may also store an operating system and another application program. Specifically, the program may include program code, and the program code includes a computer operation instruction. More specifically, the memory 2 may be a read-only memory (ROM), another type of static storage device that can store static information and instructions, a random access memory (RAM), another type of dynamic storage device that can store information and instructions, a magnetic disk storage, or the like.

The input device 4 may include an apparatus for receiving data and information entered by a user, such as a keyboard, a mouse, a camera, a scanner, a light pen, a voice input apparatus, and a touchscreen.

The output device 5 may include an apparatus that is allowed to output information to a user, such as a display screen, a printer, and a speaker.

The communications interface 3 may be an apparatus that uses any type of transceiver, to communicate with another device or communications network, such as Ethernet, a radio access network (RAN), and a wireless local area network (WLAN). The communications interface 3 may be configured to support the node in communicating with another apparatus. For example, the communications interface 3 is configured to support the node A in the network shown in FIG. 2 in communicating with the other nodes (the node B, the node C, and the node D). The communications interface 3 may also be configured to implement functions of the step 401 and the receiving module 610.

The controller/processor 1 may be configured to perform the processing process in FIG. 4 and/or another process of the technology described in this application. The controller/processor 1 may also be configured to implement the foregoing step 420, step 403, step 404, and step 405, and functions of the measurement module 620, the frequency domain transformation module 630, the extraction module 640, and the obtaining module 650.

It may be understood that FIG. 8 merely shows a simplified design of the node. In actual application, the node may include any quantity of processors, controllers, memories, communications interfaces, and the like, and any node that can implement this embodiment of this application falls within the protection scope of this application.

This application further provides a network system, and the network system includes the node shown in FIG. 5 and the node shown in FIG. 6.

This application further provides a chip system, and the chip system includes a processor that is configured to support a node in implementing a related function, for example, generating or processing data and/or information used in the foregoing method embodiments. In a possible design, the chip system further includes a memory, and the memory is configured to store a program instruction and data that are required by the node. The chip system may include a chip, or may include a chip and another discrete device.

It should be noted that all or some of the foregoing embodiments may be implemented by using software, hardware, firmware, or a combination thereof. When software is used to implement the embodiments, all or some of the embodiments may be implemented in a form of a computer program product.

The computer program product includes one or more computer instructions. When the computer program instructions are loaded and executed on the computer, all or some of the procedures or functions according to the embodiments of the present invention are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center wiredly (for example, a coaxial cable, an optical fiber, or a digital subscriber line (DSL)) or wirelessly (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

It may be clearly understood by persons skilled in the art that, for the purpose of convenient and brief description, for a detailed operating process of the foregoing system, apparatus, and unit, refer to a corresponding process in the foregoing method embodiments, and details are not described herein again.

In the specification, claims, and accompanying drawings of this application, the terms "first", "second", "third", "fourth", and so on (if existent) are intended to distinguish between similar objects but do not necessarily indicate a specific order or sequence. It should be understood that the data used in such a way are interchangeable in proper circumstances, so that the embodiments described herein can be implemented in other orders than the order illustrated or described herein. In addition, the terms "include", "contain" and any other variants thereof mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In addition, in description in the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: only A exists, both A and B exist, and only B exists. In addition, in the descriptions in the embodiments of this application, "a plurality of" means two or more than two.

In the embodiments provided in this application, it should be understood that the disclosed system, apparatus, and method may be implemented in other manners. For example, the described apparatus embodiment is merely an example.

For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A network traffic marking method comprising:
   marking, by a first node of a plurality of nodes comprised in a network, in an $i^{th}$ period, a first value on a data packet entering the network, or marking, in a $j^{th}$ period, a second value on the data packet entering the network, wherein i is an odd number, and j is an even number, and each node in the plurality of nodes is associated with a different duration of alternating periods for marking data packets entering the network; and
   forwarding, by the first node, the data packet entering the network based on a destination address included in the data packet.

2. The method according to claim 1, wherein the first value is a 1-bit value 1, and the second value is a 1-bit value 0.

3. The method according to claim 1, wherein the first node marks the first value or the second value on a header of the data packet entering the network.

4. A network traffic measurement method comprising:
   receiving, by a first node of a plurality of nodes comprised in a network, a data packet sent by a second node in the network, wherein the data packet is periodically marked by the second node in the network with a first value or a second value;
   measuring, by the first node, traffic leaving the network from the first node in N preset time periods, to obtain N traffic values, wherein N is a positive integer greater than or equal to 2;
   performing, by the first node, a frequency domain transformation on the N traffic values, to obtain a spectrum corresponding to the N traffic values;
   extracting, by the first node from the spectrum corresponding to the N traffic values, a spectrum corresponding to the second node in the network; and
   obtaining, by the first node based on the spectrum corresponding to the second node in the network, a network traffic value sent by the second node in the network to the first node in the N preset time periods.

5. The method according to claim 4, wherein each of the other nodes in the plurality of nodes in the network are configured to periodically mark a data packet entering the network from the other node with the first value or the second value in accordance with a different period duration from a period duration utilized by the second node.

6. The method according to claim 4, wherein the measuring the traffic leaving the network from the first node in the N preset time periods, to obtain N traffic values comprises:
   during each of the N preset time periods:
   setting a value of a counter to 0 at a beginning of each of the N preset time periods; and
   responsive to determining that the data packet is marked with the first value, adding a traffic value of the data packet to a current value of the counter, or
   responsive to determining that the data packet is marked with the second value, subtracting the traffic value of the data packet from the current value of the counter,
   wherein, at an end of each preset time period in the N preset time periods, a value of the counter is a traffic value in the preset time period.

7. A node, comprising:
   a processor and a transmitter, wherein
   the processor is configured to mark, in an $i^{th}$ period, a first value on a data packet entering a network, or mark, in a $j^{th}$ period, a second value on the data packet entering the network, wherein i is an odd number, and j is an even number, and each node in a plurality of nodes comprised in a network is associated with a different duration of alternating periods for marking data packets entering the network; and
   the transmitter is configured to cooperate with the processor to forward the data packet entering the network based on a destination address included in the data packet.

8. The node according to claim 7, wherein the first value is a 1-bit value 1, and the second value is a 1-bit value 0.

9. The node according to claim 7, wherein the processor is further configured to mark the first value or the second value on a header of the data packet entering the network.

10. A node, comprising:

a receiver and a processor, wherein:

the receiver is configured to cooperate with the processor to receive a data packet of data sent by a second node in a network, wherein the data packet is periodically marked by the second node in the network with a first value or a second value;

the processor is configured to:

measure traffic leaving the network from the node in N preset time periods, to obtain N traffic values, wherein N is a positive integer greater than or equal to 2;

perform frequency domain transformation on the N traffic values, to obtain a spectrum corresponding to the N traffic values;

extract, from the spectrum corresponding to the N traffic values, a spectrum corresponding to the second node in the network; and obtain, based on the spectrum corresponding to the second node in the network, a network traffic value sent by the second node in the network to the first node in the N preset time periods.

11. The node according to claim 10, wherein the processor is further configured to:

during each of the N preset time periods:

set a value of a counter to 0 at the beginning of each of the N preset time periods;

responsive to determining that the data packet is marked with the first value, adding a traffic value of the data packet to a current value of the counter, or responsive to determining that the data packet is marked with the second value, subtracting the traffic value of the data packet from the current value of the counter, wherein, at an end of each preset time period in the N preset time periods, a value of the counter is a traffic value in the preset time period.

12. A non-transitory computer-readable storage medium, comprising an instruction, wherein when the instruction runs on a computer, the computer is enabled to perform the method according to claim 1.

13. A non-transitory computer-readable storage medium, comprising an instruction, wherein when the instruction runs on a computer, the computer is enabled to perform the method according to claim 2.

14. A non-transitory computer-readable storage medium, comprising an instruction, wherein when the instruction runs on a computer, the computer is enabled to perform the method according to claim 3.

15. A non-transitory computer-readable storage medium, comprising an instruction, wherein when the instruction runs on a computer, the computer is enabled to perform the method according to claim 4.

16. A non-transitory computer-readable storage medium, comprising an instruction, wherein when the instruction runs on a computer, the computer is enabled to perform the method according to claim 5.

17. A non-transitory computer-readable storage medium, comprising an instruction, wherein when the instruction runs on a computer, the computer is enabled to perform the method according to claim 6.

* * * * *